(12) United States Patent
Hafner et al.

(10) Patent No.: US 12,151,549 B2
(45) Date of Patent: Nov. 26, 2024

(54) AIR INLET ARRANGEMENT

(71) Applicant: Bayerische Motoren Werke Aktiengesellschaft, Munich (DE)

(72) Inventors: Udo Hafner, Munich (DE); Arne Koehler, Pliening (DE); Haci Korkusuz Janket, Putzbrunn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 369 days.

(21) Appl. No.: 17/595,358

(22) PCT Filed: May 15, 2020

(86) PCT No.: PCT/EP2020/063584
§ 371 (c)(1),
(2) Date: Nov. 15, 2021

(87) PCT Pub. No.: WO2020/234142
PCT Pub. Date: Nov. 26, 2020

(65) Prior Publication Data
US 2022/0194214 A1 Jun. 23, 2022

(30) Foreign Application Priority Data
May 17, 2019 (DE) ...................... 10 2019 113 165.0

(51) Int. Cl.
*B60K 11/08* (2006.01)

(52) U.S. Cl.
CPC ......... *B60K 11/085* (2013.01); *B60Y 2400/30* (2013.01)

(58) Field of Classification Search
CPC ... B60K 11/085; B60K 11/08; B60Y 2400/30; Y02T 10/88
See application file for complete search history.

(56) References Cited

U.S. PATENT DOCUMENTS

| 8,473,164 B2 * | 6/2013 | Charnesky | B60K 11/085 123/41.04 |
| 8,752,886 B2 * | 6/2014 | Wirth | B60K 11/085 296/193.09 |

(Continued)

FOREIGN PATENT DOCUMENTS

| CN | 103485872 A | 1/2014 |
| CN | 204547750 U | 8/2015 |

(Continued)

OTHER PUBLICATIONS

International Search Report (PCT/ISA/210) issued in PCT Application No. PCT/EP2020/063584 dated Aug. 4, 2020 with English translation (six (6) pages).

(Continued)

*Primary Examiner* — Kurt Philip Liethen
(74) *Attorney, Agent, or Firm* — Crowell & Moring LLP

(57) ABSTRACT

An air inlet arrangement of a front fairing of a vehicle includes an air inlet element having at least one air inlet opening, and at least one adjustable air flap which is movable into an open position and into a closed position. The air flap in the open position opens up the air inlet opening and in the closed position closes the air inlet opening. The air flap is formed in two parts with two flap elements which are adjustable in an opposed manner.

13 Claims, 3 Drawing Sheets

(56) References Cited

U.S. PATENT DOCUMENTS

| | | | |
|---|---|---|---|
| 8,814,638 B2* | 8/2014 | Hasegawa | B60K 11/085 |
| | | | 454/75 |
| 9,840,144 B2* | 12/2017 | Aizawa | B60R 19/023 |
| 10,118,480 B2* | 11/2018 | Yasui | B60K 11/085 |
| 2011/0203861 A1 | 8/2011 | Charnesky et al. | |
| 2011/0232981 A1* | 9/2011 | Hori | B60K 11/085 |
| | | | 180/68.1 |
| 2013/0337734 A1 | 12/2013 | Knauer | |
| 2014/0335778 A1* | 11/2014 | Takanaga | B60K 11/085 |
| | | | 454/333 |
| 2015/0239337 A1 | 8/2015 | Anderson | |
| 2018/0170170 A1* | 6/2018 | Nam | B60K 11/06 |
| 2018/0304843 A1 | 10/2018 | Vacca et al. | |
| 2018/0361846 A1 | 12/2018 | Dudar | |
| 2019/0210451 A1* | 7/2019 | Parra | B60K 11/085 |
| 2022/0080823 A1* | 3/2022 | Kim | F01P 7/10 |

FOREIGN PATENT DOCUMENTS

| | | |
|---|---|---|
| CN | 108136892 A | 6/2018 |
| CN | 108473106 A | 8/2018 |
| DE | 435381 A | 10/1926 |
| DE | 20 2011 050 032 U1 | 7/2011 |
| DE | 10 2012 011 594 A1 | 12/2013 |
| EP | 2 674 316 A2 | 12/2013 |
| EP | 3 109 083 A1 | 12/2016 |

OTHER PUBLICATIONS

German-language Written Opinion (PCT/ISA/237) issued in PCT Application No. PCT/EP2020/063584 dated Aug. 4, 2020 (eight (8) pages).

German-language Search Report issued in German Application No. 10 2019 113 165.0 dated May 11, 2020 with partial English translation (11 pages).

English translation of Chinese-language Office Action issued in Chinese Application No. 202080034823.X dated Dec. 21, 2023 (8 pages).

* cited by examiner

AIR INLET ARRANGEMENT

BACKGROUND AND SUMMARY OF THE INVENTION

The invention relates to an air inlet arrangement and to a vehicle comprising the air inlet arrangement. In particular, the invention relates to an air inlet arrangement having air flaps for improved air supply and aerodynamics.

Air inlet arrangements of vehicles, for example in the form of a radiator grille, are known from the prior art. Such air inlet arrangements sometimes have flaps in order to reduce a flow through the air inlet. This is intended to improve the aerodynamics and air supply of the vehicle. However, in the case of such known air inlet arrangements, the maximum reduction potential of a coefficient of drag cannot be exhausted and an air supply is generally restricted by small air flaps.

It is therefore an object of the present invention to provide an air inlet arrangement permitting improved air supply and aerodynamics in a small construction space.

This object is achieved by the features of the independent claim. The dependent claims relate to advantageous refinements of the invention.

The object is therefore achieved by an air inlet arrangement of a front faring of a vehicle, comprising an air inlet element and at least one adjustable air flap. The air inlet element has at least one air inlet opening in order to permit air to pass through the front faring. The air inlet opening can be, for example, a frame-shaped element, for example a radiator grille, of the front faring. The air inlet opening thus preferably permits cooling air to be supplied to a radiator and/or fresh air to be supplied to an internal combustion engine or fuel cell.

The air flap is movable here into an open position and into a closed position. In the open position, the air flap opens up the air inlet opening such that air can flow through the air inlet opening. The open position is considered here to be an arrangement of the air flap in which both a complete and a partial opening of the air inlet opening is possible. A setting angle of the air flap when the latter is in the open position is preferably adjustable. That is to say, a partial opening of the air inlet opening is possible. A volumetric flow and/or a directional flow of air flow is thereby adjustable in order to obtain a flexibly adaptable air supply, for example depending on a cooling air requirement of the vehicle. In the closed position, the air flap closes the air inlet opening such that no air can flow through the air inlet opening. In the closed state, a flow thereby flows around the air inlet arrangement, thus achieving particularly good aerodynamics.

Furthermore, the air flap is designed in two parts. The air flap here has precisely two adjustable, in particular plate-shaped, flap elements. The two flap elements together close the air inlet opening. The two flap elements are adjustable in an opposed manner. That is to say, preferably one of the flap elements is foldable away upward and the other flap element downward from the air inlet opening. Thus, especially, a depth of the air inlet arrangement, i.e. an extent along the direction of travel, can be kept particularly small since less free construction space is necessary for the air flap in the open position in comparison to, for example, a single-part air flap.

The air inlet arrangement advantageously comprises an adjustment device which is configured to adjust the air flap, and a control device which is configured to control the adjustment device. It is particularly favorable here if the control device is configured to control the adjustment device depending on a driving state of the vehicle, wherein the air flap, in particular in the event of a high cooling air requirement, is moved into the open position, while the air flap, in the event of little or no cooling air requirement, is kept in the closed position. A particularly efficient driving mode of the vehicle can therefore be achieved.

The air inlet arrangement furthermore preferably comprises an environmental sensor which is arranged on the vehicle side of the air inlet element, i.e. on that side of the air inlet element which lies counter to the direction of travel. The environmental sensor is, for example, a radar sensor or a lidar sensor. The air flap is arranged here in the viewing area of the environmental sensor when this air flap is in the closed position. By moving the air flap into the open position, in particular upon complete opening, the viewing area of the environmental sensor, which is advantageously directed forward in the direction of travel, is opened up. The air flap can therefore not only regulate an air supply, but can also open up and block the viewing region of the environmental sensor. The air flap especially thereby provides protection of the environmental sensor, for example when the vehicle is at a standstill. In addition, the two-part configuration of the air flap with the flap elements adjustable in an opposed manner affords the advantage that a particularly large viewing area of the environmental sensor can be opened up by opening the air flap. Since, for example, the two flap elements can be pivoted away in an opposed manner out of the viewing region of the environmental sensor, there is no obstacle whatsoever in this viewing region when the air flap is in the open position.

In the closed position, the air flap is preferably arranged flush with a frontmost surface of the air inlet element with respect to a direction of travel of the vehicle. That is to say, in the closed state, the air flap is in the frontmost possible surface of the air inlet element. The frontmost surface of the air inlet element particularly preferably forms a homogeneous surface here when the air flap is in the closed position. A homogeneous surface is considered here preferably to be a surface without significantly protruding elements, for example ribs. In particular, a surface is considered to be a homogeneous surface if it does not have any protruding elements which protrude from the frontmost surface by more than 10 mm, in particular by more than 3 mm. That is to say, for example, geometrical structures, for example design elements, which also protrude slightly, i.e. by a maximum of 10 mm, preferably by a maximum of 3 mm, can be provided on such a homogeneous frontmost surface. The frontmost surface can preferably be flat or alternatively also arched convexly. By means of the flush arrangement of the air flap with the frontmost surface of the air inlet element, the air inlet arrangement in the closed state brings about particularly good aerodynamics since a thus optimized incident flow surface of the front faring permits a particularly low coefficient of drag.

The air flap in the open position is preferably completely arranged on a side of the frontmost surface that lies counter to the direction of travel. This is achieved, for example, by vehicle-side inward folding of the two flap elements of the air flap during the movement from the closed position into the open position. That is to say, when the air flap is in the open position, the air flap then does not protrude beyond the frontmost surface in the direction of travel, but rather is completely arranged on the vehicle side of the front faring. Favorable aerodynamics of the air inlet arrangement are thereby possible even in the open position.

The air inlet element preferably has at least two air inlet openings which are arranged next to one another and are separated from one another by at least one web lying between the two air inlet openings. Advantageously, in each case one air flap is provided per air inlet opening. In this case, the air flaps in the closed position preferably end flush with the webs which are likewise preferably arranged flush with the frontmost surface of the air inlet element. The air inlet arrangement here can advantageously comprise a second air flap, which is formed as a single part, in addition to the two-part air flap. The single-part second air flap is preferably configured here to open up and to close a second air inlet opening. The plurality of air flaps are adjusted here either independently of one another or in a manner coupled to one another. A coupled adjustment of all of the air flaps provides a particularly simple and cost-effective construction of the air inlet arrangement. By contrast, adjustment of the air flaps independently of one another makes it possible to achieve a particularly flexible adaptation of an air flow through the air inlet arrangement so as to meet requirements.

The two flap elements of the air flap are preferably each arranged so as to be foldable about a flap axis. In particular, the flap axis is arranged horizontally. The two flap axes of the respective flap elements are particularly preferably parallel to each other. It is particularly favorable here if the air inlet opening extends in an elongate manner and also in the horizontal direction. The flap axes can be arranged here in each case on an edge of the, in particular plate-like, flap elements. A door-like construction of the adjustable flap elements is thus possible and is particularly simple and reliable because of having few components. The flap axes are particularly preferably arranged outside the air inlet opening. For example, the flap axes can be arranged for this purpose within a web. Owing to the fact that the flap axes are arranged outside, i.e. next to, the air inlet opening, not only is a simple construction of the air inlet arrangement produced, but it is also possible to completely pivot the air flap in the open position out of the region of the air inlet opening such that air can flow unobstructed through the latter.

It is furthermore advantageous if the flap axes are each offset to the rear by a predefined distance from closing surfaces of the flap elements. The flap axes are arranged here in the horizontal direction preferably in alignment with the inlet opening, that is to say within a projection of the air inlet opening parallel to the direction of travel. In this case, the flap elements of the air flap are pivotable about the respective flap axis, wherein preferably in each case a closing surface of the flap elements, which in the closed position particularly preferably ends flush with the frontmost surface, is arranged at the predefined distance from the flap axis. It is favorable if the flap elements each have holding arms which extend from the flap axis to ends of the closing surface of the flap elements that each lie with respect to the horizontal and transversely with respect to the direction of travel, for the pivotable holding of the flap elements. Such a construction permits a very space-saving air inlet arrangement, wherein nevertheless a maximum opening of the air inlet opening can be achieved.

It is particularly favorable if the predefined distance of the flap axes from the respective closing surface is at least 40% and at maximum 70% of a vertical height of the air inlet opening. A particularly space-saving arrangement can therefore be provided, wherein the closing surfaces of the flap elements can be completely pivoted out of the region aligned with the air inlet opening such that air can flow unobstructed through the air inlet opening. If the flap elements of the air flap are pivoted, for example, from the closing position by 90° about the flap axis into the open position, the closing surfaces of the flap elements because of these special distance ratios in the closed position are located outside the region aligned with the air inlet opening.

It is furthermore advantageous if the air inlet arrangement furthermore comprises at least one second air flap which is configured to open up and to close a second air inlet opening. The second air flap has a plurality of sliding elements which can be slid telescopically into one another. These sliding elements engage in one another, for example, in such a manner that, in the open position, they are slid substantially parallel to the frontmost surface into a region next to the air inlet opening. Alternatively, the second air flap has a plurality of slats which can be rolled up in the manner of a roller shutter. These slats which can be rolled up can be rolled up about a roll-up spindle, which is arranged outside the region aligned with the air inlet opening, in a manner similar to a roller shutter. Further advantageous possibilities of designing the second air flap are thus produced, with all types of air flaps and all types of the opening and closing mechanism also being able to be used combined with one another as desired depending on the intended use and available construction space. In particular, instead of the air flap with opposed flap elements, the air flap described here can also be used with a plurality of sliding elements which can be slid telescopically into one another, or with a plurality of slats which can be rolled up in the manner of a roller shutter.

The air inlet arrangement advantageously furthermore comprises an oscillation stopper element. The oscillation stopper element closes at least one of the plurality of air inlet openings. The oscillation stopper element is preferably arranged in a frontmost plane, lying perpendicular to the direction of travel, of the air inlet arrangement, in which a frontmost point of the air inlet arrangement in the direction of travel is located, and thus forms a front boundary of the air inlet arrangement with respect to the direction of travel. As a result, an impact of objects against the air inlet arrangement at a low speed, for example in the event of parking prangs or another low speed crash, can be absorbed by the oscillation stopper element. Contact of these objects with the air flap is thus avoided, as a result of which damage to the air flap in the event of objects impacting at low speed is prevented by the oscillation stopper element. Such an oscillation stopper element is particularly advantageous if the frontmost surface of the air inlet arrangement is arched convexly in the direction of travel. The oscillation stopper element is located here at an apex point of the arched surface as viewed in the direction of travel.

It is particularly favorable if the air inlet arrangement is a radiator grille. Since the radiator grille lies centrally in the front faring of the vehicle and is directly exposed to the incident air flow, the special configuration of the air inlet arrangement enables a particularly good reduction of the coefficient of drag and thus optimization of the aerodynamics to be achieved.

Furthermore, the invention relates to a vehicle which comprises an air inlet arrangement according to the invention. It is also favorable if the vehicle comprises a plurality of such air inlet arrangements which are each part of the front faring of the vehicle. Owing to the improved air supply and aerodynamics of the air inlet arrangement according to the invention, it is possible here to achieve a particularly efficient driving mode of the vehicle.

Further details, features and advantages of the invention emerge from the description below and the figures.

DETAILED DESCRIPTION OF THE DRAWINGS

Figure 1:
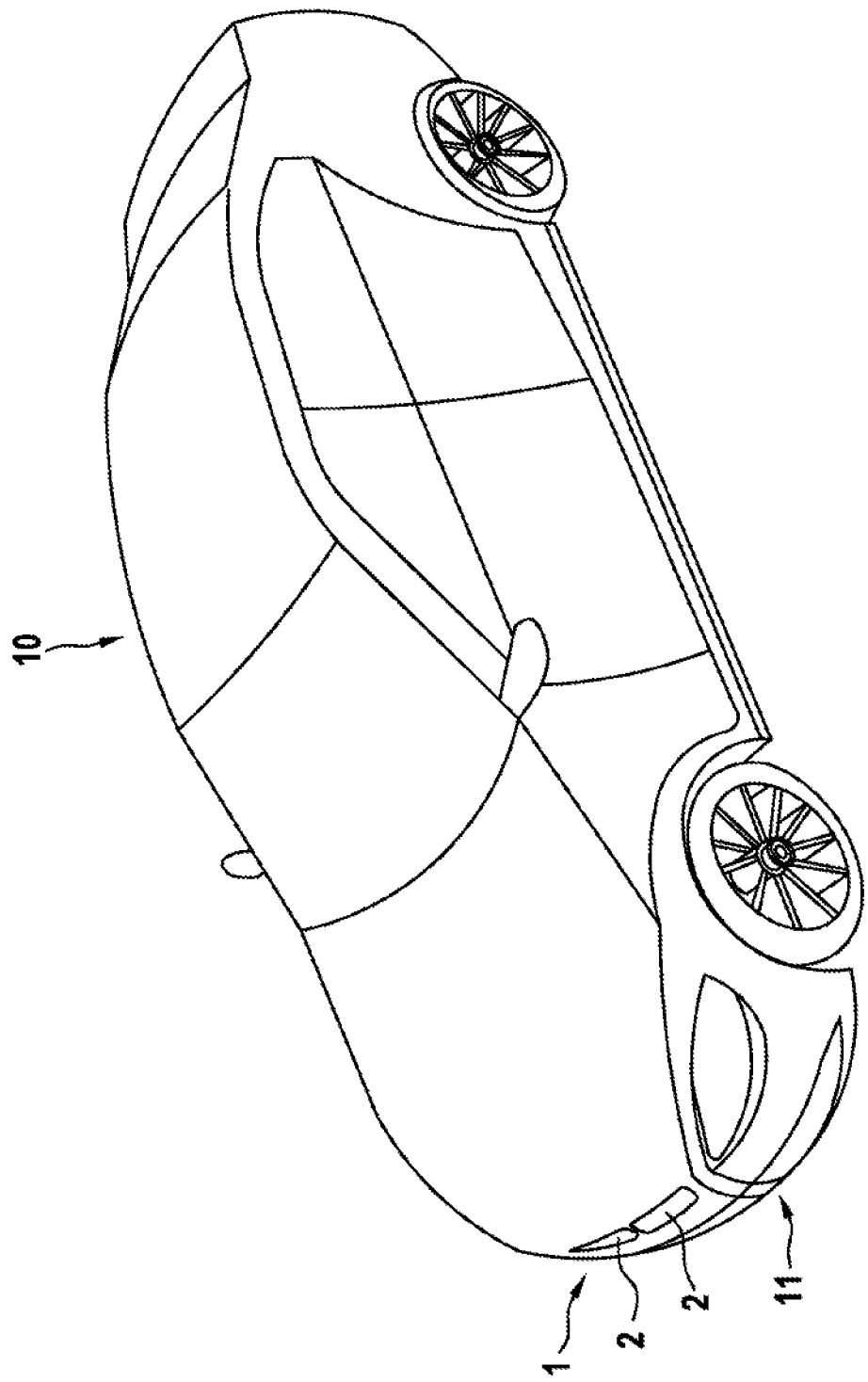
FIG. 1 shows a perspective view of a vehicle with an air inlet arrangement according to a first exemplary embodiment of the invention.

FIG. 1 shows a vehicle 10 having an air inlet arrangement 1 according to a first exemplary embodiment of the invention. The vehicle 10 is a car. The air inlet arrangement 1 is part of a front faring 11 which is arranged at a front region of the vehicle 10 in the direction of travel X.

The air inlet arrangement 1 has two air inlet elements 2 which are each designed as a radiator grille. The air inlet arrangement 1 is illustrated here in detail in FIG. 2 which shows a partial sectional view of the air inlet arrangement 1.

Figure 2:
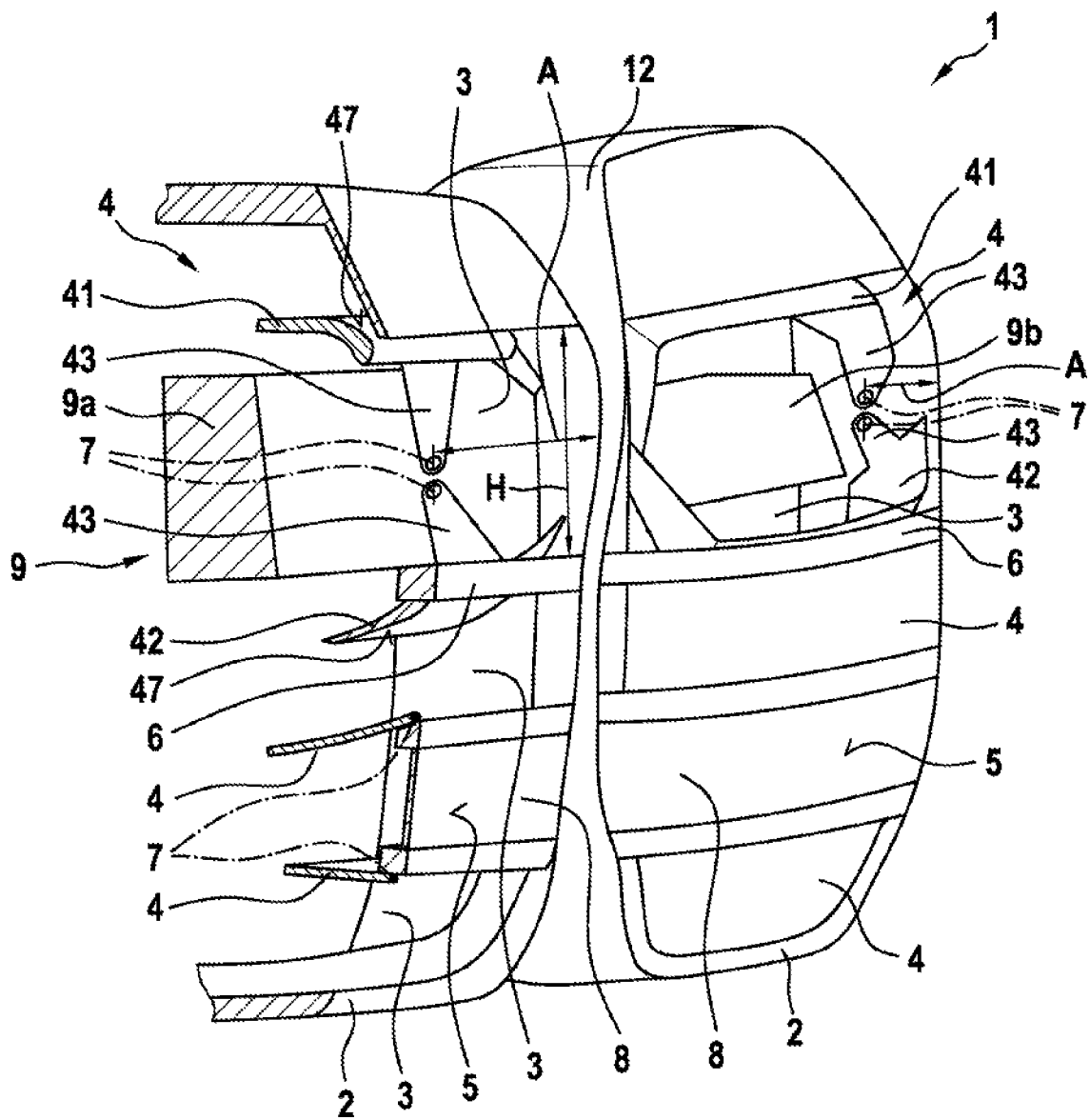
FIG. 2 shows a detailed partial sectional view of the air inlet arrangement of FIG. 1.

As can be seen in FIG. 2, the air inlet arrangement 1 has a frame 12 in which the two air inlet elements 2 lying next to each other are arranged. Each of the air inlet elements 2 here has three air inlet openings 3 through which, in each case in an open state, air can be conducted through the front faring 11 to a radiator, not illustrated. A horizontal web 6 is arranged between each of the air inlet openings 3. The air inlet openings 3 thus lie one above another in the vertical direction.

The air inlet arrangement 1 in each case has one adjustable air flap 4 per air inlet opening 3. The air flaps 4 are each of plate-shaped configuration and are movable into an open position and into a closed position. In the open position, each of the air flaps 4 opens up the corresponding air inlet opening 3, as illustrated for all the air inlet openings 3 of the left air inlet element 2 and the uppermost air inlet opening 3 of the right air inlet element 2 in FIG. 2. In the open position, the air flaps 4 are each pivoted here inward on the vehicle side such that they do not protrude forward. In the closed position, in which the two lower air flaps 4 of the right air inlet element 2 of FIG. 2 are arranged, the air flaps 4 in each case close the corresponding air inlet opening 3.

When the air flaps 4 are in the closed position, they are arranged flush with a frontmost surface 5 of the air inlet elements 2 in the direction of travel X of the vehicle 10. The frontmost surface 5 is defined here by the respective frontmost boundaries of the frame 12 and of the webs 6 in the direction of travel X. It can be seen with reference to the two lower air flaps 4, which are arranged in the closed position, of the right air inlet element 2 of FIG. 2 that, in the case of such a flush arrangement of the air flaps 4 in the frontmost surface 5, a flush and closed boundary of the air inlet arrangement 1 is formed. In a driving mode of the vehicle 10, particularly favorable aerodynamics of the vehicle 10 can therefore be achieved in the closed state of the air inlet openings 3. This special arrangement of the air flaps 4 flush with the frontmost surface 5 in the closed position makes it possible for a particularly low-loss, in particular contiguous, air flow to be achieved at the front faring 11 during a driving mode of the vehicle 10, which leads to a particularly low coefficient of drag of the vehicle 10.

A detailed configuration of the air flaps 4 and an adjustment mechanism by means of which the air flaps 4 are movable into the closed position and into the open position will be described below.

The first exemplary embodiment of FIGS. 1 and 2 shows two different types of air flaps 4 and, correspondingly, two different types of adjustment mechanisms of the air flaps 4. The lower two air flaps 4 of the two air inlet elements 2 are in each case designed as single-part, plate-shaped air flaps 4.

These single-part air flaps 4 are each foldable about a horizontal flap axis 7. The flap axis 7 is located here within the web 6 directly adjacent to the frontmost surface 5. As a result, the single-part air flaps 4 are adjustable particularly simply by being moved either into the closed position or into the open position which is folded away from the closed position by 90°.

Furthermore, in each case the upper air flap 4 of the two air inlet elements 2 is designed in two parts with two flap elements 41, 42 which are adjustable in an opposed manner. Each of these two flap elements 41, 42 is foldable separately here about a respective flap axis 7. These two flap axes 7 are parallel to each other. In this case, however, the flap axes 7 are each arranged by a distance A on the vehicle side away from closing surfaces 47 of the flap elements 41, 42, the closing surfaces in the closed position ending flush with the frontmost surface 5. In order to connect the corresponding flap axis 7 to the closing surfaces 47, a holding arm 43 is provided at each horizontal end of the flap elements 41, 42. The distance A corresponds here to 50% of a vertical height H of the upper air inlet opening 3. This special arrangement of the flap axes 7 of the upper two-part air flaps 4 makes it possible to achieve a particularly space-saving arrangement of the flap elements 41, 42 in the open position, with a particularly large air inlet opening 3 being able to be opened up by the opposed movement of these flap elements 41, 42. This is particularly favorable in order to open up a viewing area of maximum size of environmental sensors 9 which, as illustrated in FIG. 2, are provided as part of the air inlet arrangement 1 on the vehicle side adjacent to each air inlet element 2. The environmental sensors 9 here are a lidar sensor 9b and a radar sensor 9a.

Furthermore, the air inlet arrangement 1 comprises one oscillation stopper element 8 per air inlet element 2. The oscillation stopper element 8 is in each case arranged between the two lower webs 6 of the air inlet elements 2 and closes an air inlet opening 3 which is otherwise present there. The oscillation stopper element 8 likewise lies here in the frontmost surface 5 of the air inlet element 2 and is not movable, but rather constitutes a fixed covering. The oscillation stopper element 8 can thereby absorb forces acting on the air inlet arrangement 1, for example in the event of a parking prang, as a result of which damage to the air flaps 4 is prevented. In addition, a crossmember (not illustrated) for fastening the air inlet arrangement 1 to the vehicle 10 or for stiffening the air inlet arrangement 1 can be provided on the vehicle side of the oscillation stopper element 8.

Figure 3:
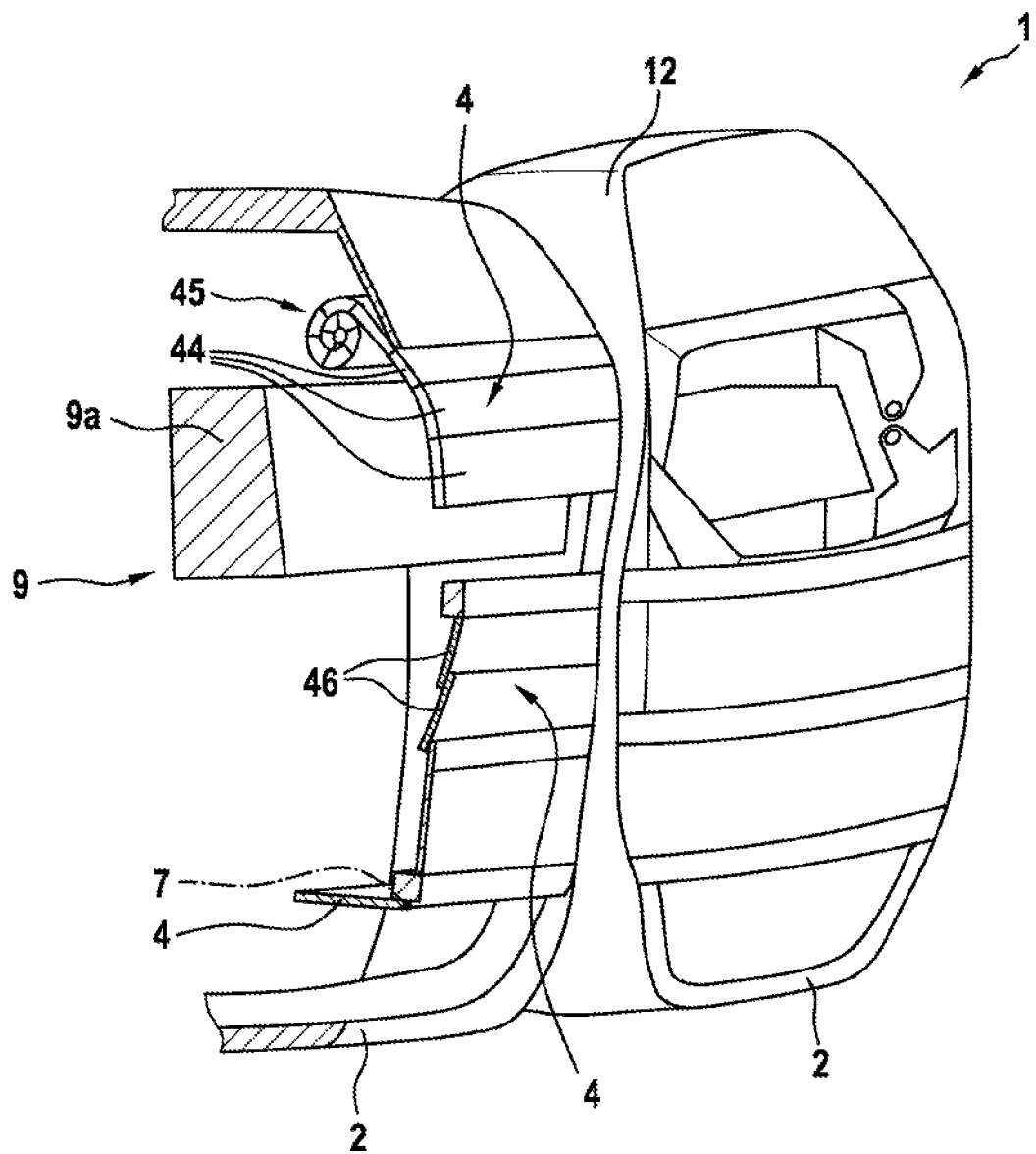
FIG. 3 shows a detailed partial sectional view of an air inlet arrangement according to a second exemplary embodiment of the invention.

FIG. 3 shows a detailed partial sectional view of an air inlet arrangement 1 according to a second exemplary embodiment of the invention. The second exemplary embodiment substantially corresponds here to the first exemplary embodiment of FIGS. 1 and 2 with an alternative configuration of two air flaps 4 and the adjustment mechanism thereof. This results in further favorable configuration possibilities for configuring the air flaps 4 to be movable between the open position and the closed position.

In detail, in the second exemplary embodiment of FIG. 3, the two upper air flaps 4 of the left air inlet element 2 are configured in an alternative way. The uppermost air flap 4 is designed here in the manner of a roller shutter with a plurality of slats 44 which can be rolled up. These slats 44 can be rolled up about a horizontal roll-up spindle 45 arranged above the corresponding air inlet opening 3, in order to open up the air inlet opening 3. In addition, the slats 44 can be unrolled again from this roll-up spindle 45 in order to close the air inlet opening 3. The air inlet opening 3 is illustrated in a partially open state in FIG. 3.

In addition, in the second exemplary embodiment, the central air flap 4 of the left air inlet element 2 is adjustable by means of a sliding mechanism. This central air flap 4 in this connection has two sliding elements 46 which can be slid telescopically into one another and can be displaced substantially parallel to the front surface 5 into the oscillation stopper element 8.

It is noted that the positions of the air flaps 4 illustrated in the figures are illustrated merely by way of example. In fact, each of the air flaps 4 can in each case take up any position between the open position and the closed position also in any combination with the further air flaps 4. In addition, any combinations of the illustrated and described construction variants of the air flaps 4 can be used in the air inlet arrangement 1.

LIST OF REFERENCE DESIGNATIONS

1 Air inlet arrangement
2 Air inlet element
3 Air inlet opening
4 Air flap
5 Frontmost surface
6 Web
7 Flap axis
8 Oscillation stopper element
9 Environmental sensors
9*a* Radar sensor
9*b* Lidar sensor
10 Vehicle
11 Front faring
12 Frame
41, 42 Flap elements
43 Holding arm
44 Slats
45 Roll-up spindle
46 Sliding elements
A Distance
H Height
X Direction of travel

What is claimed is:

1. An air inlet arrangement of a front faring of a vehicle, comprising:
    an air inlet element having an air inlet opening; and
    at least one adjustable air flap which is movable into an open position and into a closed position,
    wherein the air flap in the open position opens up the air inlet opening and in the closed position closes the air inlet opening,
    wherein the air flap is formed in two parts with two flap elements which are adjustable in an opposed manner,
    wherein the air flap in the closed position is arranged flush with a frontmost surface of the air inlet element with respect to a direction of travel of the vehicle, such that a frontmost boundary of the air inlet opening is closed,
    the two flap elements are each arranged so as to be foldable about a horizontal flap axis,
    the flap axes are each offset toward a rear of the vehicle by a distance from closing surfaces of the flap elements, and the distance is at least 40% and at maximum 70% of a total vertical height of the air inlet opening.

2. The air inlet arrangement according to claim 1, further comprising:
    an environmental sensor arranged on a vehicle side of the air inlet element,
    wherein a viewing area of the environmental sensor is opened up by opening the air flap.

3. The air inlet arrangement according to claim 1, wherein the air flap in the open position is completely arranged on a side of the frontmost surface that lies counter to the direction of travel.

4. The air inlet arrangement according to claim 1, wherein
    the air inlet element comprises a second air inlet opening and at least one web which is arranged between the air inlet opening and the second air inlet opening, and
    the air flap in the closed position is arranged flush with a frontmost surface of the at least one web with respect to a direction of travel of the vehicle, such that frontmost boundary of the air inlet opening is closed.

5. The air inlet arrangement according to claim 1, wherein the flap axes are each positioned immediately adjacent to one another in a center of a vertical dimension of the air inlet opening.

6. The air inlet arrangement according to claim 1, further comprising:
    at least one second air flap which is configured to open up and to close a second air inlet opening,
    wherein the second air flap has a plurality of sliding elements which are slidable telescopically into one another,
    wherein the at least one second air flap in a closed position is arranged flush with the frontmost surface of the air inlet element with respect to the direction of travel of the vehicle, such that a frontmost boundary of the second air inlet opening is closed.

7. The air inlet arrangement according to claim 1, further comprising:
    an oscillation stopper element which closes at least one air inlet opening.

8. The air inlet arrangement according to claim 1, wherein the air inlet element is a radiator grille.

9. A vehicle comprising an air inlet arrangement according to claim 1.

10. The air inlet arrangement according to claim 1, further comprising:
    at least one second air flap which is configured to open up and to close a second air inlet opening,
    wherein the second air flap has a plurality of slats which are rollable up in a manner of a roller shutter, and
    wherein the at least one second air flap in a closed position is arranged flush with the frontmost surface of the air inlet element with respect to the direction of travel of the vehicle, such that a frontmost boundary of the second air inlet opening is closed.

11. The air inlet arrangement according to claim 1, wherein
    the air flap in the closed position forms a homogeneous surface with the air inlet element.

12. The air inlet arrangement according to claim 6, wherein
    the second air flap in the closed position forms a homogeneous surface with the second inlet element.

13. The air inlet arrangement according to claim 10, wherein
    the second air flap in the closed position forms a homogeneous surface with the second inlet element.

\* \* \* \* \*